Sept. 2, 1952  R. T. ANDERSON  2,609,186
SCRUBBER FOR SOLVENT EXTRACTION TOWERS
Filed Dec. 9, 1948
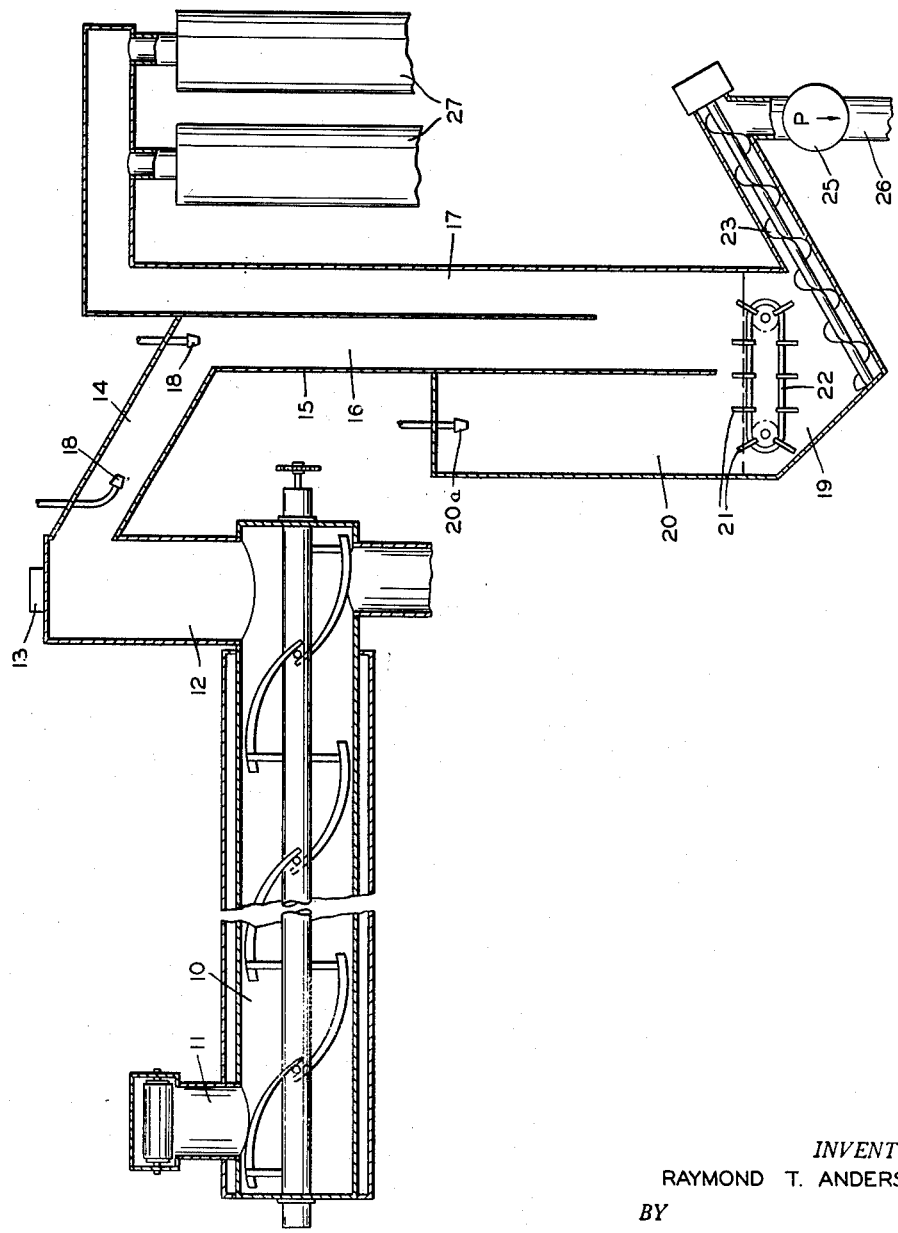
INVENTOR.
RAYMOND T. ANDERSON
BY
Hyde, Meyer, Baldwin & Doran
ATTORNEYS Patented Sept. 2, 1952

2,609,186

UNITED STATES PATENT OFFICE 2,609,186

SCRUBBER FOR SOLVENT EXTRACTION TOWERS

Raymond T. Anderson, Lakewood, Ohio, assignor to The V. D. Anderson Company, Cleveland, Ohio, a corporation of Ohio Application December 9, 1948, Serial No. 64,319

1 Claim. (Cl. 261—2)

This invention relates to solvent extraction apparatus, and more particularly to a scrubber for removing fine solid material or dust from the gases or vapours leaving the meal driers.

One object of the invention is to improve generally the recovery or separation of dust from the vapours or gases issuing from driers for solid material, and especially the solid product of solvent extraction plants.

Another object is to provide an efficient system for the purpose, and especially one which takes care of foam and very fine dust, compelling mixture thereof with a liquid for ultimate separation or recovery from such liquid.

Still another object is to provide improved means for dust separation by a wet method in which the dust is incorporated into a liquid mass from which it is removed by settling in more or less sludge or aggregate form.

Another object is to simplify and improve the apparatus utilizing both liquid sprays and mechanical conveyors for separating dust from a gas stream and conveying it in sludge or aggregate form to a collecting vessel.

Further objects of the invention in part are obvious and in part will appear more in detail hereinafter.

In the drawings, the single view illustrates more or less conventionally and in diagram form one arrangement of apparatus embodying the invention.

Solvent extraction systems of the character to which this invention relates are used extensively for the extraction, by a suitable volatile solvent, such as hexane, of oil from seeds, nuts or other material of vegetable or animal origin, of which cotton seed, flax seed, soy beans, babassu nuts, copra and the like are examples. In such systems, the treated solid material, after draining and expressing the larger part of the oil carrying liquid therefrom, is conveyed to driers and is heated to drive off, in vapour or gaseous form, all remaining traces of solvent. The gases thus produced carry with them some solid material in the form of fine dust, the separation of which is desirable not only for the values recovered but also to reduce clogging of the solvent recovery condensers, the conduits therefor, and other apparatus through which the gas stream may flow. It is the purpose of this invention to secure improved economy and efficiency in such dust separation and collection.

In the drawings, 10 illustrates the uppermost one of a series of steam heated meal driers to which a stream of expressed meal, with low liquid content, is supplied by way of supply conduit 11, and from all of which driers the dust carrying gases and vapours produced by the applied heat are discharged by way of outlet pipe 12. This pipe, or a portion thereof, in the present apparatus, is made large enough, say thirty to thirty-six inches in diameter, to serve as a settling chamber in which a large proportion of the larger and heavier particles settle by gravity against the force of the stream, thus returning to the drier for agglomeration and ultimate recovery with and as a part of the solid product of the driers. Settling chamber or separator 12 may be provided with a large safety valve 13 to take care of sudden rises of pressure.

The gas stream issuing from separator 12 is conducted by conduit 14 to the upper end of a scrubber 15. This comprises a tall tower divided by a vertical partition into down channel 16 and up channel 17 through which the gases pass in series. Spray nozzles 18 at the upper end of the down channel may be used to direct spray streams of either water or solvent liquid or both downwardly in channel 16 to entrain and trap as much dust as possible and thus collect it in the bath of liquid 19 at the bottom of the scrubber.

Some foam usually arises, forms or collects upon the bath, to take care of which the scrubber is provided with a side bay providing a foam chamber 20 into which the liquid bath extends. Slowly moving paddles 21, eight to twelve inches high, carried by endless belt or chains 22, skim off any foam topping the bath and carry it into the foam chamber, where the liquid sprayed from nozzle 20a breaks down the foam, entrapping any solid particles it contains in the bath.

One or more suitable conveyors 23 constantly collect the solid material trapped in liquid bath 19 and elevate it to an overflow outlet at the liquid level. The drawings show one of several small screw conveyors 23, about six inches in diameter and inclined at about thirty degrees from the horizontal. Such an arrangement continuously discharges the collected fine solid material with a small amount of liquid, in the form of sludge, which may be conducted by way of a suitable sludge pump 25 and conduit 26 to a toaster or drier, or even back to the top of the extracting column or unit, or to any point where it may rejoin the stream of solid material being treated.

The stream of gas or vapours in scrubber 15, cleared of dust in the manner described, flows by way of up channel 17 to and through condensers 27, where all solvent is condensed and recovered for re-use.

The apparatus described not only is highly efficient in its recovery of both fine solid particles and solvent vapours, but also protects the condensers from clogging and enables them to operate for long periods without cleaning.

Other advantages of the invention will be apparent to those skilled in the art.

What I claim is:

Apparatus for removing dust from the vapours discharged from a meal drier, comprising a settling chamber extending upward vertically from said drier and having its lower end in free vapour-flow communication with said drier, said settling chamber being of a cross-sectional area approximately equal to the cross-sectional area of the drier, a downwardly inclined passage having its upper end in communication with the top of the settling chamber, a scrubber in communication with said downwardly inclined passage, said scrubber being of bifurcated form having a downward branch in communication at its top end with said passage, and an upward branch having its lower end in communication with the lower end of said downward branch, a partition separating said branches but permitting communication between said branches below its lower edge, means for supplying a liquid spray in said downward branch, a liquid reservoir in the common zone of communication of the two said branches and below said partition, a supply of liquid in said reservoir having its upper surface below said partition, conveying means extending from the bottom of said reservoir upwardly and outwardly above the liquid level for discharging sludge from said reservoir, said reservoir being provided with an endless belt having a series of paddles thereon, means for producing travel of said belt whereby said paddles move in succession across the upper surface of the liquid in said reservoir, a side bay disposed adjacent said scrubber, said paddles being disposed to move surface foam in said reservoir towards said bay, and liquid spray means in said bay directed towards said foam.

RAYMOND T. ANDERSON.

REFERENCES CITED

The following references are of record in the file of this patent:

UNITED STATES PATENTS

| Number | Name | Date |
| --- | --- | --- |
| 880,747 | Morby | Mar. 3, 1908 |
| 1,049,796 | Anderson | Jan. 7, 1913 |
| 1,078,254 | Carpenter et al. | Nov. 11, 1913 |
| 1,350,605 | Greenawalt | Aug. 24, 1920 |
| 1,398,394 | Robbins | Nov. 29, 1921 |
| 1,557,442 | Eichelman | Oct. 13, 1925 |
| 1,793,620 | Jacobus | Feb. 24, 1931 |
| 2,215,574 | Bernstein | Sept. 24, 1940 |
| 2,321,893 | Bimpson | June 15, 1943 |